United States Patent
Andersen et al.

(10) Patent No.: US 8,603,423 B2
(45) Date of Patent: *Dec. 10, 2013

(54) THREE WAY CATALYST COMPRISING EXTRUDED SOLID BODY

(75) Inventors: Paul Joseph Andersen, Plymouth Meeting, PA (US); Ralf Dotzel, Nuremberg (DE); Kwangmo Koo, Wayne, PA (US); Rainer Leppelt, Lichtenfels (DE); Jörg Werner Münch, Lichtenfels (DE); Jeffery Scott Rieck, King of Prussia, PA (US); Hubert Schedel, Küps (DE); Duncan John William Winterborn, Cambridge (GB); Todd Howard Ballinger, Downingtown, PA (US); Julian Peter Cox, Malvern, PA (US)

(73) Assignee: Johnson Matthey Public Limited Co., London (GB)

(*) Notice: Subject to any disclaimer, the term of this patent is extended or adjusted under 35 U.S.C. 154(b) by 0 days.

This patent is subject to a terminal disclaimer.

(21) Appl. No.: 13/384,570

(22) PCT Filed: Feb. 1, 2011

(86) PCT No.: PCT/GB2011/050158
§ 371 (c)(1),
(2), (4) Date: Jan. 17, 2012

(87) PCT Pub. No.: WO2011/092517
PCT Pub. Date: Aug. 4, 2011

(65) Prior Publication Data
US 2012/0117953 A1 May 17, 2012

Related U.S. Application Data

(60) Provisional application No. 61/300,279, filed on Feb. 1, 2010.

(51) Int. Cl.
*B01D 53/94* (2006.01)
*B01J 23/10* (2006.01)
*B01J 29/06* (2006.01)
*B01J 29/068* (2006.01)
*F01N 3/10* (2006.01)
*F01N 3/28* (2006.01)

(52) U.S. Cl.
USPC ......... 423/213.2; 423/213.5; 502/60; 502/64; 502/66; 502/74; 502/87; 502/304; 60/299

(58) Field of Classification Search
USPC ............ 423/213.2, 213.5; 502/60, 64, 66, 74, 502/87, 304; 60/299
See application file for complete search history.

(56) References Cited

U.S. PATENT DOCUMENTS

| | | | |
|---|---|---|---|
| 3,181,231 A | 5/1965 | Breck | |
| 4,510,261 A | 4/1985 | Pereira et al. | |
| 5,244,852 A * | 9/1993 | Lachman et al. | 502/66 |
| 5,292,991 A * | 3/1994 | Lachman et al. | 585/850 |
| 5,447,694 A * | 9/1995 | Swaroop et al. | 422/171 |
| 5,552,128 A | 9/1996 | Chang et al. | |
| 5,589,147 A | 12/1996 | Farnos et al. | |
| 5,772,972 A | 6/1998 | Hepburn et al. | |
| 5,897,846 A | 4/1999 | Kharas et al. | |
| 6,110,862 A | 8/2000 | Chen et al. | |
| 6,248,684 B1 | 6/2001 | Yavuz et al. | |
| 6,432,859 B1 | 8/2002 | Iwakuni et al. | |
| 6,488,903 B2 | 12/2002 | Mathes et al. | |
| 6,555,081 B2 | 4/2003 | Hori et al. | |
| 6,667,018 B2 * | 12/2003 | Noda et al. | 423/213.5 |
| 6,780,805 B2 | 8/2004 | Faber et al. | |
| 7,507,684 B2 | 3/2009 | Hofmann et al. | |
| 8,087,235 B2 | 1/2012 | Strehlau et al. | |
| 8,263,032 B2 * | 9/2012 | Andersen et al. | 423/213.2 |

(Continued)

FOREIGN PATENT DOCUMENTS

| | | |
|---|---|---|
| EP | 0 756 891 A1 | 2/1997 |
| EP | 0 801 972 A1 | 10/1997 |

(Continued)

OTHER PUBLICATIONS

Ido et al., "Fundamental Study and Possible Application of New Concept Honeycomb Substrate for Emission Control," *SAE Technical Paper Series*, Paper No. 2007-01-0658, Copyright © 2007 SAE International.

(Continued)

*Primary Examiner* — Timothy Vanoy
(74) *Attorney, Agent, or Firm* — RatnerPrestia

(57) ABSTRACT

A three way catalyst includes an extruded solid body having: 10-95% by weight of at least one binder/matrix component; 5-90% by weight of a zeolitic molecular sieve; and 0-80% by weight optionally stabilized ceria. The catalyst further includes at least one precious metal and optionally at least one non-precious metal. The at least one precious metal is carried in a coating layer on a surface of the extruded solid body; at least one metal is present throughout the extruded solid body and at least one precious metal is also carried in a coating layer on a surface of the extruded solid body; or at least one metal is present throughout the extruded solid body, is present in a higher concentration at a surface of the extruded solid body and at least one precious metal is also carried in a coating layer on the surface of the extruded solid body.

20 Claims, 4 Drawing Sheets

(56) References Cited

U.S. PATENT DOCUMENTS

| | | |
|---|---|---|
| 2002/0051742 A1 | 5/2002 | Hotta et al. |
| 2002/0077247 A1 | 6/2002 | Bender et al. |
| 2002/0140138 A1 | 10/2002 | Wu et al. |
| 2002/0183191 A1 | 12/2002 | Faber et al. |
| 2003/0125194 A1* | 7/2003 | Abe et al. ............... 502/66 |
| 2003/0224933 A1 | 12/2003 | Kondo et al. |
| 2006/0179825 A1 | 8/2006 | Hu et al. |
| 2007/0012028 A1 | 1/2007 | Weissman et al. |
| 2007/0014710 A1 | 1/2007 | Gerlach et al. |
| 2007/0134145 A1 | 6/2007 | Strehlau et al. |
| 2007/0259770 A1 | 11/2007 | Hofmann et al. |
| 2008/0069743 A1 | 3/2008 | Castellano et al. |
| 2008/0182020 A1 | 7/2008 | Eberle et al. |
| 2009/0143221 A1 | 6/2009 | Ogunwumi et al. |
| 2009/0196813 A1 | 8/2009 | Sobolevskiy et al. |
| 2010/0034717 A1 | 2/2010 | Adelmann et al. |
| 2010/0050604 A1 | 3/2010 | Hoard et al. |
| 2010/0111789 A1 | 5/2010 | Fajardie et al. |
| 2010/0222205 A1 | 9/2010 | Ogunwumi et al. |
| 2010/0290963 A1 | 11/2010 | Andersen et al. |
| 2010/0295218 A1 | 11/2010 | Dotzel et al. |
| 2010/0296992 A1 | 11/2010 | Jiang et al. |
| 2011/0021856 A1 | 1/2011 | Lai et al. |

FOREIGN PATENT DOCUMENTS

| | | |
|---|---|---|
| EP | 1 338 322 A1 | 8/2003 |
| EP | 1 493 484 A1 | 1/2005 |
| EP | 1 739 066 A1 | 1/2007 |
| EP | 1 837 063 A1 | 9/2007 |
| EP | 2 105 589 A1 | 9/2009 |
| EP | 2 123 354 A1 | 11/2009 |
| EP | 2 130 589 A2 | 12/2009 |
| EP | 2 130 603 A2 | 12/2009 |
| EP | 2 130 605 A2 | 12/2009 |
| GB | 2 450 484 A | 12/2008 |
| JP | 63-72342 A | 4/1988 |
| JP | 2010-497 A | 1/2010 |
| JP | 2010-499 A | 1/2010 |
| WO | WO-99/47260 A1 | 9/1999 |
| WO | WO-2006/093802 A2 | 9/2006 |
| WO | WO-2008/049491 A1 | 3/2008 |
| WO | WO-2008/132452 A2 | 11/2008 |
| WO | WO-2008/154739 A1 | 12/2008 |
| WO | WO-2009/001131 A1 | 12/2008 |
| WO | WO-2009/080155 A1 | 7/2009 |
| WO | WO-2009/093071 A1 | 7/2009 |
| WO | WO-2010/099288 A2 | 9/2010 |
| WO | WO-2010/099395 A1 | 9/2010 |
| WO | WO-2011/026573 A1 | 3/2011 |
| WO | WO-2011/080525 A1 | 7/2011 |

OTHER PUBLICATIONS

Howitt et al., "Cellular Ceramic Diesel Particulate Filter," *SAE Technical Paper Series*, Paper No. 810114, Copyright © 1981 Society of Automotive Engineers, Inc.

Heck et al., *Catalytic Air Pollution Control—Commercial Technology*, Second Edition, John Wiley & Sons, Inc., New York, 2002, Chapters 7 and 9, pp. 130-185 and 212-262.

International Search Report dated May 11, 2011, from PCT International Application No. PCT/GB2011/050158.

British Search Report dated May 31, 2011, from British Patent Application No. 1101655.7.

Li et al., "Application of zeolites as hydrocarbon traps in automotive emission controls," *Studies in Surface Science and Catalysis*, 2005, vol. 158, pp. 1375-1382.

U.S. Appl. No. 13/384,568, filed Jan. 17, 2012, Andersen et al.
U.S. Appl. No. 13/384,562, filed Jan. 17, 2012, Dotzel et al.
U.S. Appl. No. 13/384,564, filed Jan. 17, 2012, Dotzel et al.
U.S. Appl. No. 13/384,572, filed Jan. 17, 2012, Collier et al.

* cited by examiner

THREE WAY CATALYST COMPRISING EXTRUDED SOLID BODY

CROSS-REFERENCE TO RELATED APPLICATIONS

This application is the U.S. National Phase application of PCT International Application No. PCT/GB2011/050158, filed Feb. 1, 2011, and claims priority of U.S. Provisional Patent Application No. 61/300,279, filed Feb. 1, 2010, the disclosures of both of which are incorporated herein by reference in their entireties for all purposes.

FIELD OF THE INVENTION

The present invention relates to three-way catalysts comprising an extruded solid body for use in treating exhaust gas emissions from internal combustion engines particularly for stationary source and mobile i.e. vehicular (automobile) applications.

BACKGROUND OF THE INVENTION

US 2002/0183191 discloses a three-way catalyst comprising a zeolite/alumina composite catalyst support exhibiting a modulus of rupture of at least 750 psi and having a zeolite with a silica/alumina ratio of at least 300, which catalyst support is impregnated with a noble metal selected from the group consisting of platinum, rhodium, iridium and palladium. The three-way catalyst has high cell density, thin walls and no washcoat. In one embodiment, the catalyst support contains optionally stabilised zirconia in addition to the zeolite and alumina. The zirconia dopant can include cerium oxide in amounts up to 80 wt % based on the total zirconium amount. However, no Example including optionally doped zirconia is provided.

US '191 explicitly excludes washcoating with a catalyst-containing slurry to avoid a reduction in the channel size of a honeycomb and increased backpressure. Furthermore, the use of silica binder is excluded because of incompatibility between silica and platinum group metals. Hence, gamma alumina is used as the binder. However, in the comparison examples provided, the three-way catalyst performance (measured as light off temperature for converting CO, $NO_x$ and hydrocarbons) of catalysts according to the invention, particularly for 50:50 and 40:60 weight ratios of zeolite:gamma alumina, compare poorly with comparative examples comprising an alumina-only extruded support or a zeolite/silica binder-based support.

U.S. Pat. No. 5,772,972 discloses an automotive catalyst system for treating internal combustion engine exhaust gases. The system comprises a hybrid system of a zeolite hydrocarbon trap and a palladium-based three-way catalyst material carried on a substrate monolith. In one embodiment, the three-way catalyst is layered on an extruded zeolite substrate monolith. However, no specific Example including an extruded zeolite substrate monolith is provided.

EP 1739066 discloses a honeycomb structure comprising multiple honeycomb units having multiple through holes; and a seal layer that joins honeycomb units with each other via respective closed outer faces of the honeycomb units where the through holes are not open. The honeycomb unit includes at least inorganic particles, inorganic fibers and/or whiskers. The inorganic particles exemplified are alumina, titania, silica and zirconia; the inorganic fibres exemplified are silica alumina fibres; and the inorganic binders exemplified are silica sol, alumina sol, sepiolite and attapulgite. A catalyst component can be carried on the honeycomb structure. The catalyst component may include at least one type selected among noble metals including platinum, palladium and rhodium, alkali metals such as potassium and sodium, alkaline earth metal e.g., barium and oxides. The honeycomb structure can be used as a catalytic converter e.g., a three-way catalyst or a $NO_x$ storage catalyst for conversion of the exhaust gas of vehicles.

SUMMARY OF THE INVENTION

We have now developed a family of three-way catalysts comprising an extruded solid body coated with at least one precious metal with particular application in the field of exhaust gas aftertreatment of internal combustion engine exhaust gas. Such exhaust gases may result from stationary source emissions, but they have been developed for use in particular for treating mobile sources of emissions, such as passenger cars, trucks and buses.

According to one embodiment, the invention provides a three-way catalyst comprising an extruded solid body comprising: 10-95% by weight of at least one binder/matrix component; 5-90% by weight of a zeolitic molecular sieve, a non-zeolitic molecular sieve or a mixture of any two or more thereof; and 0-80% by weight optionally stabilised ceria, which catalyst comprising at least one precious metal and optionally at least one non-precious metal, wherein:

(i) the at least one precious metal is carried in one or more coating layer(s) on a surface of the extruded solid body;

(ii) at least one metal is present throughout the extruded solid body and at least one precious metal is also carried in one or more coating layer(s) on a surface of the extruded solid body; or (iii) at least one metal is present throughout the extruded solid body, is present in a higher concentration at a surface of the extruded solid body and at least one precious metal is also carried in one or more coating layer(s) on the surface of the extruded solid body.

An advantage of the present invention is that by removing catalytic components that are often used in catalytic coatings, the number of coatings can be reduced, e.g. from two layers to one layer. This has benefits in reducing backpressure in an exhaust system, increasing the efficiency of the engine.

The present invention has a number of particular advantages over catalysts according to US '191 described hereinabove. Whilst the inventors acknowledge that by coating a extruded body that some of the drawbacks mentioned in US '191 may be encountered in certain configurations of three-way catalysts according to the present invention, such drawbacks are significantly outweighed by the fundamental improvement in catalytic activity, particularly relative to 50:50 and 40:60 by weight zeolite:alumina embodiments disclosed in US '191. Furthermore, the present invention is not restricted to use of non-silica binders. Additionally, lower silica:alumina ratio molecular sieves can be used in the present invention which allows the molecular sieves to be ion-exchanged to a greater extent with metals that promote HC adsorption (ion exchange sites are removed by increasing silica:alumina ratio) for reducing cold-start HC emissions.

Also it is possible to increase the volume of active components in an extruded solid body relative to a coating on an inert substrate monolith. This increased catalyst density has advantages for long term durability and catalyst performance, which is important for on-board diagnostics.

BRIEF DESCRIPTION OF THE FIGURES

In order that the invention may be more fully understood, the following Examples are provided by way of illustration only and with reference to the accompanying drawings in which.

DETAILED DESCRIPTION OF THE INVENTION

Figure 1:
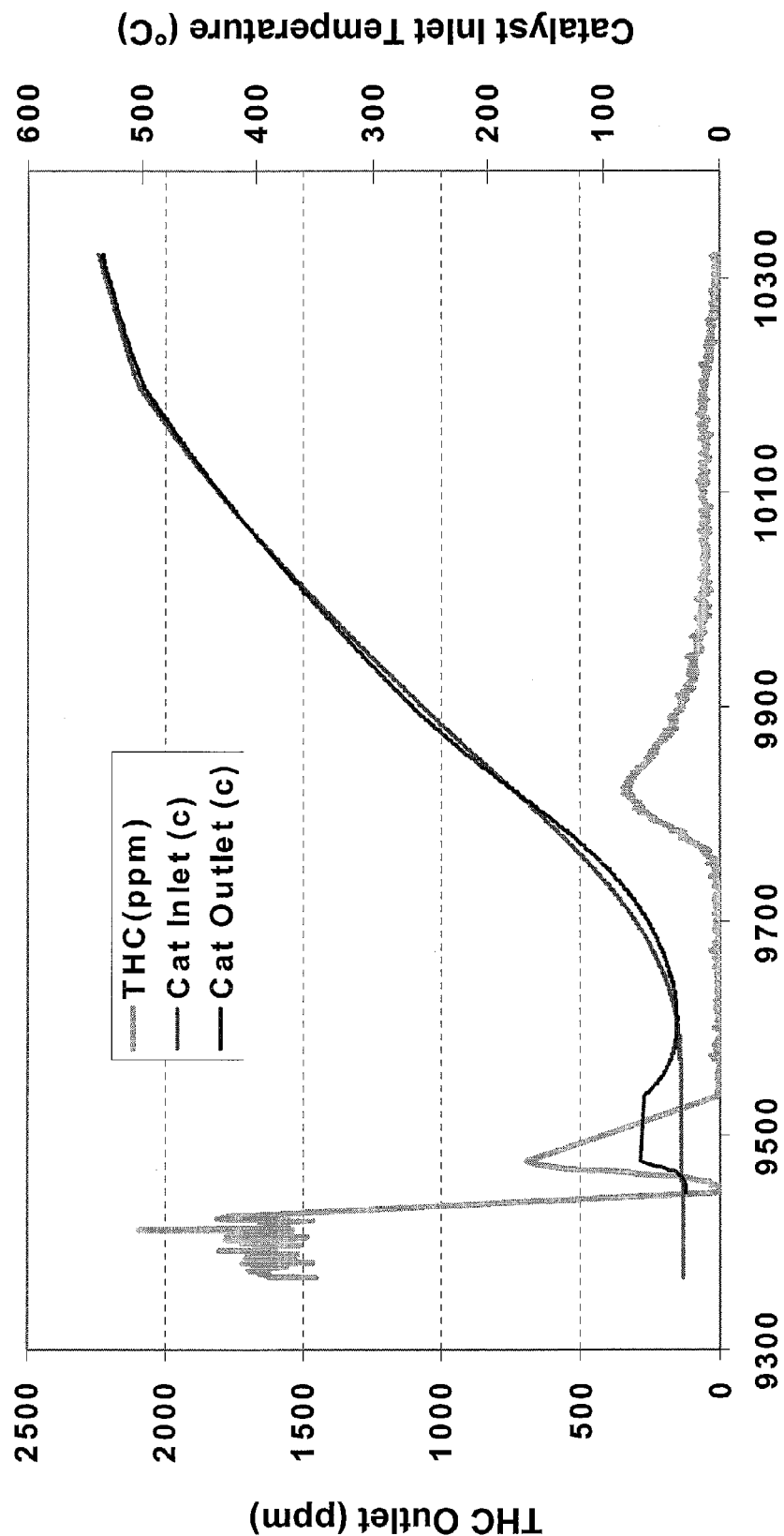
FIG. 1 is a graph showing the experimental test procedure for analysing the activity of a three-way catalyst according to Example 2.

"On board diagnostics" (OBD) in the context of a motor vehicle is a generic term to describe the self diagnostic and reporting capability of the vehicle's systems provided by a network of sensors linked to a suitable electronic management system. Early examples of OBD systems would simply illuminate a malfunction indicator light if a problem were detected, but it provided no information on the nature of the problem. More modern OBD systems use a standardised digital connection port and are capable of providing information on standardised diagnostic trouble codes and a selection of real-time data, which enable rapid problem identification and resolution of a vehicle's systems.

Current OBD requirements require that a driver must be notified in case of a malfunction or deterioration of the emission system that would cause emissions to exceed mandatory thresholds. So, for example, the OBD limits for passenger petrol (gasoline) vehicles, the Euro 4 limits are: CO—3.2 g/km; HC—0.4 g/km; NO—0.6 g/km; and PM—no limit.

Future vehicular emissions legislation, especially in US and Europe, requires higher sensitivity in diagnostic function so as continuously to monitor the ability of an exhaust system aftertreatment catalyst to meet the emission legislation. For example, the current draft OBD limits for positive ignition (gasoline) passenger vehicles: CO—1.9 g/km; NMHC—0.25 g/km; NO—0.54 g/km; and PM—no limit.

In the U.S., it is understood that the OBD II legislation (Title 13, California Code Regulations, Section 1968.2, Malfunction and Diagnostic System Requirements for 2004 and Subsequent Model-Year Passenger Cars, Light-Duty Trucks and Medium-Duty Vehicles and Engines) for catalyst monitoring of gasoline/spark ignited engines requires a malfunction signal where the average Federal Test Procedure (FTP) test for NMHC conversion efficiency of a monitored portion of a catalyst system falls below 50%.

Extruded solid bodies according to the present invention generally comprise a unitary structure in the form of a honeycomb having uniform-sized and parallel channels extending from a first end to a second end thereof. Generally, the channels are open at both the first and second ends—a so-called "flow through" configuration. Channel walls defining the channels are porous. Typically an external "skin" surrounds a plurality of the channels of the extruded solid body. The extruded solid body can be formed from any desired cross section, such as circular, square or oval. Individual channels in the plurality of channels can be square, triangular, hexagonal, circular etc. Channels at a first, upstream end can be blocked e.g. with a suitable ceramic cement, and channels not blocked at the first, upstream end can also be blocked at a second, downstream end to form a so-called wall-flow filter. Typically, the arrangement of the blocked channels at the first, upstream end resembles a chequer board with a similar arrangement of blocked and open downstream channel ends.

It is clear that the honeycomb structure disclosed in EP 1739066 has a Thermal Shock Parameter (TSP) too low to be used in a single unitary extrudate, because the honeycomb structure comprises an assembly of individual honeycomb units cemented together. This, arrangement, also seen in commercially available silicon carbide honeycombs, is designed to avoid catastrophic catalyst substrate failure due to inter alia thermal shock as a result of a relatively high Coefficient of Thermal Expansion (CTE) of the extruded material. However, the manufacture of a honeycomb structure from individual honeycomb units is complicated, laborious, time consuming and expensive and increases the number of possible physical failure modes, e.g. at the cement bonds, compared with a single piece extrusion. A more complete explanation of TSP and CTE can be found in "Catalytic Air Pollution Control—Commercial Technology", Second Edition, R. M. Heck et al., John Wiley & Sons, Inc., New York, 2002 Chapters 7 (in relation to flowthrough monoliths) and 9 (for wall-flow filters).

Accordingly, the extruded solid body of the catalyst according to the invention may preferably have an axial Thermal Shock Parameter (TSP) and a radial TSP sufficient to avoid radial cracks and ring cracks in the extruded solid body when used for treating exhaust gases from a stationary or mobile source of emissions. In this way the extruded solid body can be formed from a single unitary extrudate. For extruded solid bodies having a particularly large cross-section, it may still be necessary to extrude segments of the extruded solid body for cementing together. However, this is because of difficulties in processing extrudates of such a large cross section, or because of limitations in the size of the extrudate die tooling. Taken individually, however, each segment of the whole catalyst would meet the functional limitation that the axial TSP and the radial TSP are sufficient to avoid radial cracks and ring cracks in the individual extruded solid body segments when used for treating exhaust gases from a stationary or mobile source of emissions. In one embodiment the radial TSP is >0.4 at 750° C., such as >0.5, >0.6, >0.7, >0.8, >0.9, or >1.0. At 800° C., the radial TSP is desirably also >0.4 and, particularly for three-way catalysts (which experience higher temperatures in use) the TSP at 1000° C. is preferably >0.8.

The CTE of wall-flow filters is preferably $20 \times 10^{-7}$/° C. in order to be formed from a one-piece extrudate.

In embodiments, the at least one binder/matrix component can be selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof.

Spinels can be $MgAl_2O_4$ or the Mg can be partially replaced by a metal from the group consisting of Co, Zr, Zn or Mn. In embodiments the content of MgO in the $MgAl_2O_4$ relative to $Al_2O_3$ can be from 0.8 to 2.5, with values of <1.0 preferred.

The alumina binder/matrix component is preferably gamma alumina, but can be any other transition alumina, i.e. alpha alumina, beta alumina, chi alumina, eta alumina, rho alumina, kappa alumina, theta alumina, delta alumina, lanthanum beta alumina and mixtures of any two or more such transition aluminas.

It is preferred that the alumina is doped with at least one non-aluminium element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Sources of silica can include a silica, a silica sol, quartz, fused or amorphous silica, sodium silicate, an amorphous aluminosilicate, an alkoxysilane, a silicone resin binder such as methylphenyl silicone resin, a clay, talc or a mixture of any two or more thereof.

Of this list, the silica can be $SiO_2$ as such, feldspar, mullite, silica-alumina, silica-magnesia, silica-zirconia, silica-thoria, silica-berylia, silica-titania, ternary silica-alumina-zirconia, ternary silica-alumina-magnesia, ternary-silica-magnesia-zirconia, ternary silica-alumina-thoria and mixtures of any two or more thereof. Alternatively, the silica can be derived from calcining tetramethyl ortho silicate (TMOS) added to the extrusion composition.

Suitable clays include fullers earth, sepiolite, hectorite, a smectite, a kaolin and mixtures of any two or more thereof, wherein the kaolin can be chosen from subbentonite, anauxite, halloysite, kaolinite, dickite, nacrite and mixtures of any two of more thereof; the smectite can be selected from the group consisting of montmorillonite, nontronite, vermiculite, saponite and mixtures of any two or more thereof; and the fullers earth can be montmorillonite or palygorskite (attapulgite).

Inorganic fibres are selected from the group consisting of carbon fibres, glass fibres, metal fibres, boron fibres, alumina fibres, silica fibres, silica-alumina fibres, silicon carbide fibres, potassium titanate fibres, aluminum borate fibres and ceramic fibres.

Suitable molecular sieves for use in the present invention are those capable of adsorbing unburned hydrocarbons following cold-start of an automobile engine and desorbing adsorbed hydrocarbons at above ambient temperature, e.g. when an associated precious metal-based three-way catalyst component has reached a desired light-off temperature for e.g. CO and HC oxidation or $NO_x$ reduction. Such molecular sieves are generally not those having an 8-ring pore opening structure as its largest pore opening structure, sometimes called "small pore" molecular sieves. Preferred molecular sieves are medium pore (maximum 10-ring pore opening structure), large pore (maximum 12-ring pore opening structure) or oven meso pore (>12-ring pore opening structure) molecular sieves.

The or each zeolitic molecular sieve or the or each non-zeolitic molecular sieve can be selected from the framework type code ABW, AEL, AET, AFG, AFI, AFO, AFR, AFS, AFY, AHT, AST, ASV, ATN, ATO, ATS, ATV, AWO, AWW, BCT, BEA, BEC, BIK, BOF, BOG, BPH, BRE, BSV, CAN, CAS, CFI, CGF, CGS, —CHI, —CLO, CON, CZP, DAC, DFO, DOH, DON, EMT, EON, ESV, ETR, EUO, EZT, FAR, FAU, FER, FRA, GIU, GME, GON, HEU, IFR, IMF, ISV, ITH, ITR, IWR, IWS, IWV, IWW, JBW, JRY, LAU, LIO, -LIT, LOS, LOV, LTF, LTL, LTN, MAR, MAZ, MEI, MEL, MEP, MFI, MFS, MOR, MOZ, MRE, MSE, MSO, MTF, MTN, MTT, MTW, MWW, NAB, NAT, NES, NON, NPO, OBW, OFF, OSI, OSO, —PAR, PON, —RON, RRO, RSN, RTE, RUT, RWR, RWY, SAO, SAS, SBE, SBS, SBT, SFE, SFF, SFG, SFH, SFN, SFO, SFS, SGT, SOD, SOF, SOS, SSF, SSY, STF, STI, STO, STT, STW, —SVR, SZR, TER, TOL, TON, TUN, UOS, UOZ, USI, UTL, VET, VFI, VSV, WEI or —WEN as defined by the Structure Commission of the International Zeolite Association and mixtures of any two or more thereof.

Preferred zeolitic and non-zeolitic molecular sieves are selected from the group consisting of BEA, FAU, FER, MFI, MFS, MOR, STI, SZR and mixtures of any two or more thereof.

Particularly preferred zeolitic or non-zeolitic molecular sieves are selected from the group consisting of BEA, FER, MFI, STI and mixtures of any two or more thereof. Particularly preferred zeolitic molecular sieves are ZSM-5, beta, ferrierite and mixtures of any two or more thereof.

Although natural zeolitic molecular sieves can be used in the present invention, we prefer synthetic aluminosilicate zeolitic molecular sieve having a silica-to-alumina ratio of 10 or greater, for example 15 to 150, 20 to 60 or 25 to 40 for improved thermal stability.

In an alternative embodiment, the zeolitic molecular sieve or the non-zeolitic molecular sieve is an isomorph containing one or more substituent framework metal. In this embodiment, the or each substituent framework metal can be selected from the group consisting of As, B, Be, Ce, Co, Cu, Fe, Ga, Ge, Li, Mg, Mn, Zn and Zr, with Ce, Cu and Fe. Again, preferred isomorphic zeolitic or non-zeolitic molecular sieves can be selected from the group consisting of BEA, FER, MFI, STI and mixtures of any two or more thereof, with BEA including Fe in its framework particularly preferred. It will be understood that the process of manufacturing such isomorphs containing one or more substituent framework metal, the or each metal may be present in the final product either solely in the framework or in the framework and ion-exchanged.

Silica-to-alumina ratios in isomorphs containing one or more substituent framework metal can be >25, such as 30 to 100 or 40 to 70. By contrast, the isomorph can have a silica-to-framework metal ratio of >20, such as from 30 to 200 or 50 to 100.

In a preferred embodiment, the non-zeolitic molecular sieve is an aluminophosphate, including AlPOs, metal substituted AlPOs (MeAlPOs), silicoaluminophosphates (SAPOs) or a metal substituted silicoaluminophosphates (MeAPSOs).

Silica-to-alumina ratios of the aluminophophates are generally much lower than aluminosilicate zeolites sharing the same framework type code. Typically, the silica-to-alumina ratio of aluminophosphates is <1.0, but can be <0.5 or even <0.3.

The ceria component can be optionally stabilised with at least one non-cerium element to increase the thermal stability of the ceria. Suitable ceria stabilisers include zirconium, lanthanides and mixtures of any two or more thereof. Lanthanide stabilisers include La, Nd, Pr, Gd and mixtures of any two or more thereof. The $CeO_2$:$ZrO_2$ ratio by weight can be e.g., between 80:20 or 20:80. Commercially available materials include 30% by weight $CeO_2$, 63% $ZrO_2$, 5% $Nd_2O_3$, 2% $La_2O_3$; and 40% $CeO_2$, 50% $ZrO_2$, 4% $La_2O_3$, 4% $Nd_2O_3$ and 2% $Y_2O_3$.

Broadly, the at least one metal can be present: (a) throughout the extruded solid body, i.e. the at least one metal is present in the extrudate composition; (b) present in a higher concentration at a surface of the extruded solid body; and/or (c) carried in one or more coating layer(s) on a surface of the extruded solid body in features (ii) and (iii) is different from the at least one metal present in each of the other location(s) at (a), (b) and (c). So the at least one metal can be present at location (c), (a) plus (c) or (a) plus (b) plus (c). Where the at least one metal is present in (a) and (c) or (a), (b) and (c), the at least one metal in each location can be the same or different.

Where the at least one metal is present in location (a), i.e. throughout the extruded solid body, the at least one metal can be associated with a zeolitic molecular sieve, a non-zeolitic molecular sieve or a mixture of any two or more thereof. An example of "associated with" includes being ion exchanged with the zeolitic molecular sieve component, the non-zeolitic molecular sieve component or either or both of the zeolitic molecular sieve component and the non-zeolitic molecular sieve components in the mixture. It is also possible in mixtures of two or more molecular sieves to have the at least one metal associated with one molecular sieve and not the other. For example, a first molecular sieve can be ion-exchanged with copper, dried and calcined and then mixed with a different molecular sieve with no associated additional metal.

It is known that certain associated metals can contribute to HC adsorption with advantage for the present invention. Preferred adsorption promoting metals include Pd and/or Cu, Ag, alkaline earth metals and alkali metals, e.g. Cs.

Alternatively, one of two molecular sieves in a mixture can be associated, e.g. ion exchanged, with a first at least one metal and then a second at least one metal can be added to the extrudate composition, i.e. the second at least one metal is not specifically associated with the second molecular sieve.

Suitable at least one metal(s) to associate with the or each molecular sieve component can be selected individually from the group consisting of a transition metal, a lanthanide or a mixture of any two or more thereof. Suitable transition metals include Group IB metals, Group IVB metals, Group VB metals, Group VIIB metals and Group VIII metals. Preferably the at least one transition metal is selected from the group consisting of Fe, Cu, Ce, Hf, La, Mn, Pt, Au, Ag, In, Rh, V, Ir, Ru, and Os and mixtures of any two or more thereof. The lanthanide metal can be La, Pr, Ce and mixtures of two or more thereof.

The total metal content in the at least one metal associated with the or each molecular sieve component is from 0.1 to 20% by weight, such as from 1 to 9% by weight.

The at least one metal present: throughout the extruded solid body but not associated with the or each molecular sieve; in the majority of the at least one metal located at the surface of the extruded solid body; in one or more coating layer(s) on the surface of the extruded solid body; or in the higher concentration at the surface of the extruded solid body can be selected from the group consisting of an alkali metal, an alkaline earth metal, a transition metal, a lanthanide or a mixture of any two or more thereof.

Suitable coatings for supporting catalytic metals for use in the present invention include one or more of alumina ($Al_2O_3$), particularly γ-alumina, silica ($SiO_2$), titania ($TiO_2$), ceria ($CeO_2$), zirconia ($ZrO_2$), vanadia ($V_2O_5$), lanthana ($La_2O_3$) and zeolites. The ceria and alumina can be optionally stabilised using the same stabilisers as used for the extruded solid body. Suitable catalytic metals include one or more of the precious metals (Au, Ag and the platinum group metals, including Pt, Pd and Rh)). Ceria and stabilised ceria is typically included in a three-way catalyst as an oxygen storage component (OSC). In order to promote the HC adsorption activity of the extruded zeolite which has been coated with a precious metal containing washcoat, it can be advantageous to use a so-called wide-pore supports, e.g. alumina, as washcoat support for the precious metal (see e.g. U.S. Pat. No. 6,110,862, i.e. a catalytic material comprising a platinum group metal component dispersed on a refractory inorganic oxide support phase, the support phase comprising a first support material having a pore size distribution in which about 98% of the pore volume of the first support material is provided by pores that have a radius in the range of about 30 to 240 Å).

Techniques for locating at least one metal in higher concentration at the surface of the extruded solid body include impregnation, preferably thickened impregnation, i.e. an impregnation medium thickened with a rheology modifier. Drying methods can also be used to concentrate metals at a surface of the extruded solid body. For example, a so-called "egg shell" technique, where metals are concentrated at the surface can be obtained by drying the impregnated extruded solid body relatively slowly so that the metals are deposited at the surface by wicking. Particular choices of salts and pH conditions can also be used to direct metal deposition, e.g. by determining the isoelectric point of the extruded solid body and then using the correct combination of pH and metal salts to benefit from an electrostatic attraction between cations or anions in the metal salts and the extruded solid body.

Suitable transition metals include a Group IB metal, a Group IVB metal, a Group VB metal, a Group VIB metal, a Group VIIB metal and a Group VIII metal. Preferably, the or each transition metal is selected from the group consisting of Fe, Ni, W, Cu, Ce, Hf, La, Mn, Pt, Au, Ag, In, V, Ir, Ru, Rh, Os and mixtures of any two or more thereof; lanthanide metals can be La, Pr or Ce or mixtures of any two or more thereof; alkali metals include K and Cs; and alkaline earth metals can be selected from Ba and Sr.

The total metal content throughout the extruded solid body but not associated with the or each molecular sieve component; located at the surface of the extruded solid body; and/or in the higher concentration at the surface of the extruded solid body can be from 0.1 to 20% by weight, such as from 1 to 9% by weight.

The total metal content of the extruded solid body, i.e. including any metal associated with the or each molecular sieve, can be from 0.1 to 25% by weight, such as from 1 to 15% by weight.

The total metal content of the catalyst as a whole, including one or more coating layer(s) on a surface of the extruded solid body comprises at least one metal, can be from 0.1 to 30% by weight, such as from 1 to 25% by weight.

Particularly preferred precious metals for use in the one or more coating layer(s) on the surface of the extruded solid body for promoting three-way catalytic activity are Pd per se, a combination of Pt and Rh, a combination of Pd and Rh or a combination of Pt, Pd and Rh. Where more than one precious metal is present, each metal can be disposed in a separate layer, one or more precious metal can be present in one layer and one or less than all the precious metals can be present in another layer; or all precious metals can be present in each layer but each layer can comprise a different ratio of each precious metal to the or each other precious metal.

In specific examples, the catalyst according to the invention comprises an extruded solid body comprising:
10-95% by weight of a cordierite, nitrides, carbides, borides, intermetallics, lithium aluminosilicate, an optionally doped alumina, a silica source, titania, zirconia, titania-zirconia, zircon and mixtures of any two or more thereof; 0-80% by weight of spinel;
5-90% by weight of a zeolitic molecular sieve, a non-zeolitic molecular sieve or a mixture of any two or more thereof, each optionally containing one or more metal;
0-80% by weight optionally stabilised ceria; and
0-25% by weight inorganic fibres.

The content of the at least one binder/matrix component can be >15% by weight, >20% by weight, >30% by weight, >35% by weight, >40% by weight, >45% by weight, >50% by weight, >55% by weight, >60% by weight, >65% by weight or >70% by weight, >75% by weight, >80% by weight, >85% by weight or >90% by weight.

The content of the spinel can be >10% by weight, >15% by weight, >20% by weight, >30% by weight, >35% by weight, >40% by weight, >45% by weight, >50% by weight, >55% by weight, >60% by weight, >65% by weight or >70% by weight.

The content of the total content of the molecular sieve(s) can be >10% by weight, >15% by weight, >20% by weight, >30% by weight, >35% by weight, >40% by weight, >45% by weight, >50% by weight, >55% by weight, >60% by weight, >65% by weight or >70% by weight, >75% by weight, >80% by weight, >85% by weight or >90% by weight.

The content of the optionally stabilised ceria can be >5% by weight, >10% by weight, >15% by weight, >20% by weight, >30% by weight, >35% by weight, >40% by weight, >45% by weight, >50% by weight, >55% by weight, >60% by weight, >65% by weight or >70% by weight.

The content of the inorganic fibres can be >5% by weight, >10% by weight, >15% by weight or >20% by weight.

In an embodiment the extruded solid body consists essentially of: 10-50% by weight of cordierite, nitrides, carbides, borides, intermetallics, lithium aluminosilicate, a spinel, an optionally doped alumina, a source of silica, titania, zirconia, titania-zirconia, zircon and mixtures of any two or more thereof; 50-90% by weight of a zeolitic molecular sieve, a non-zeolitic molecular sieve or a mixture of any two or more thereof, each optionally containing one or more metal; and 0-25% by weight of inorganic fibres. This extruded solid body can be arranged as a flow-through substrate monolith or it can be used to make a wall-flow filter. Preferred embodiments contain inorganic fibres.

Further embodiments can use an extruded solid body consisting essentially of: 10-37% by weight of cordierite, nitrides, carbides, borides, intermetallics, lithium aluminosilicate, an optionally doped alumina, a spinel, a silica source, titania, zirconia, titania-zirconia, zircon and mixtures of any two or more thereof; 60-88% by weight of a zeolitic molecular sieve, a non-zeolitic molecular sieve or a mixture of any two or more thereof, each optionally containing one or more metal; and 0-20% by weight of inorganic fibers; or: 15-30% by weight of cordierite, nitrides, carbides, borides, intermetallics, lithium aluminosilicate, an optionally doped alumina, a spinel, titania, zirconia, titania-zirconia, zircon and mixtures of any two or more thereof; 2-20% by weight of a source of silica; 50-81% by weight of a zeolitic molecular sieve, a non-zeolitic molecular sieve or a mixture of any two or more thereof, each optionally containing one or more metal; and 2-10% by weight of inorganic fibres.

In another embodiment suited for use in three-way catalysts, the extruded solid body can consist essentially of: 10-75% by weight of cordierite, nitrides, carbides, borides, intermetallics, lithium aluminosilicate, an optionally doped alumina, a spinel, a silica source, titania, zirconia, titania-zirconia, zircon and mixtures of any two or more thereof; 5-50% by weight of a zeolitic molecular sieve, a non-zeolitic molecular sieve or a mixture of any two or more thereof, each optionally containing one or more metal; 20-80% by weight optionally stabilised ceria; and 0-25% by weight of inorganic fibres. Preferred embodiments contain zeolites and inorganic fibres.

In developing extruded solid bodies for use in $NO_x$ trap catalysts according to the present invention, we have encountered a lack of strength in the extruded solid body in the composition: 69% by weight of $CeO_2$, and 23% by weight of $\gamma$-$Al_2O_3$ and 8% by weight glass fibres. Current proposals for increasing strength include pre-calcining the $CeO_2$ material to reduce surface loss during calcinations of the "green" extruded solid body; increasing the alumina content to 50%+; changing the particle size of the alumina (e.g. from commercially available Pural™ to Disperal™) and/or the optionally stabilised ceria; adding an inert binder to increase mechanical stability e.g. a clay; use a different alumina e.g. an alumina sol; testing other binder systems e.g. $TiO_2$ sols, $CeO_2$ sols; cerium acetate; zirconium acetate; optimising the pH; and adding surface modifiers e.g. aluminium salts or other organic surfactants. In preliminary tests we have found that the presence of silica can affect $NO_x$ trap performance. However, research is continuing and this option will be further investigated. However, in one embodiment the content of a source of silica will be reduced or removed altogether.

Where any of the above extruded solid bodies are made into a wall-flow filter, the porosity of the wall-flow filter can be from 30-80%, such as from 40-70%.

In more specific examples according to the present invention:

(i) a catalysed soot filter comprises an extruded solid body in the wall-flow filter configuration consisting essentially of: 15-70% by weight of cordierite, nitrides, carbides, borides, intermetallics, lithium aluminosilicate, a spinel, an optionally doped alumina, titania, zirconia, titania-zirconia, zircon and mixtures of any two or more thereof; 0-20% by weight of a source of silica; 5-50% by weight of a zeolitic molecular sieve, a non-zeolitic molecular sieve or a mixture of any two or more thereof, each optionally containing one or more metal; 20-80% by weight optionally stabilised ceria; and 0-20% by weight of inorganic fibres, which extruded solid catalyst body being coated with one or more layer(s) comprising supported at least one precious metal and combinations of any two or more precious metals;

(ii) a three-way catalyst comprises an extruded solid body in the flow-through configuration, consisting essentially of: 15-30% by weight of cordierite, nitrides, carbides, borides, intermetallics, lithium aluminosilicate, a spinel, an optionally doped alumina, titania, zirconia, titania-zirconia, zircon and mixtures of any two or more thereof; 0-20% by weight of a source of silica; 50-81% by weight of a zeolitic molecular sieve, a non-zeolitic molecular sieve or a mixture of any two or more thereof, each optionally containing one or more metal; and 0-20% by weight of inorganic fibres, which extruded solid catalyst body being coated with a single layer comprising a mixture of a majority of $\gamma$-alumina and a stabilised ceria supporting palladium only, a mixture of palladium and rhodium, a mixture of platinum and rhodium or a mixture of platinum, palladium and rhodium;

According to a further aspect, the invention provides a process of manufacturing a three-way catalyst according to any preceding claim, which process comprising the steps of: forming a solid extruded body by mixing powdered starting materials of: at least one binder/matrix component or a precursor of one or more thereof; zeolitic molecular sieve, non zeolitic molecular sieve or a mixture of any two or more thereof which zeolitic molecular sieve, non-zeolitic molecular sieve or mixture of zeolitic and non-zeolitic molecular sieves being optionally associated with at least one metal; an optional optionally stabilised ceria; and an optional at least one metal compound; with optional inorganic fibers; optionally adding an organic auxiliary agent; processing by mixing and/or kneading in an acid or alkaline aqueous solution optionally containing a metal salt of at least one metal into a plastic compound to form a mixture; extruding the mixture into a catalyst body, drying the catalyst body and calcining to form a solid extruded body; selecting quantitative proportions of the starting materials such that the solid extruded body comprises 10-95% by weight of at least one binder/matrix component; 5-90% by weight of a zeolitic molecular sieve, a non-zeolitic molecular sieve or a mixture of any two or more thereof; and 0-80% by weight optionally stabilised ceria, and coating a surface of the solid extruded body with at least one coating layer(s) containing at least one precious metal and optionally also impregnating a surface of the solid extruded body with at least one metal.

Very generally, the production of an extruded solid body, a binder, an organic viscosity-enhancing compound and a liquid for converting the material by blending into an homogeneous paste are added to the binder/matrix component or a precursor thereof and optional molecular sieve, optional optionally stabilised ceria, optional inorganic fibres and optional at least one metal compound, and the mixture is compacted in a mixing or kneading apparatus or an extruder. The mixtures have organic additives such as binders, plasticizers, surfactants, lubricants, dispersants as processing aids to enhance wetting and therefore produce a uniform batch. The resulting plastic material is then moulded, in particular using an extrusion press or an extruder including an extrusion die, and the resulting mouldings are dried and calcined. The organic additives are "burnt out" during calcinations of the extruded solid body.

The at least one binder/matrix component is selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. An alumina precursor can be used which is aluminium hydroxide or boehmite. Where an aluminium oxide is used, to ensure the binding with the aluminium oxide, it is advantageous to add an aqueous solution of a water-soluble metal salt to the aluminium oxide or the precursor substance of the aluminium oxide before adding the other starting materials.

In embodiments, the silica source can be selected from the group consisting of a silica, a silica sol, quartz, fused or amorphous silica, sodium silicate, an amorphous aluminosilicate, an alkoxysilane, a silicone resin binder, a clay, talc or a mixture of any two or more thereof.

In a particular embodiment, the silica source is a silicone resin binder and a solvent for the silicone resin binder is isopropyl alcohol or a dibasic ester.

One embodiment of the process according to the present invention comprises the step of first admixing an optionally doped alumina or a precursor thereof with the solution and subsequently admixing the zeolitic molecular sieve, non zeolitic molecular sieve or a mixture of any two or more thereof and the inorganic fibres.

The organic auxiliary agent for use in the process according to the present invention can be one or more selected from the group consisting of a cellulose derivative, an organic plasticizer, a lubricant and a water-soluble resin. Examples of suitable cellulose derivatives include cellulose ethers selected from the group consisting of methylcellulose, ethylcellulose, carboxymethylcellulose, ethylhydroxyethylcellulose, hydroxyethylcellulose, hydroxypropylcellulose, methylhydroxyethylcellulose, methylhydroxypropylcellulose and combinations of any two or more thereof. Cellulose derivatives increase the porosity of the final product, which is advantageous for the catalytic activity of the solid catalyst body. Initially the cellulose swells in the aqueous suspension but is ultimately removed during the calcining process.

The organic plasticizer for use in the process of the present invention is selected from the group consisting of polyvinyl alcohol, polyvinyl butyral, an ionomer, acrylics, copolyethylene/acrylic acid, polyurethane, a thermoplastic elastomers, a relatively low molecular weight polyester, linseed oil, a ricinoleate and combinations of any two or more thereof.

The water-soluble resin can be a polyacrylate.

The lubricant for use in the process according to the present invention is selected from at least one of the group consisting of ethylene glycol, stearic acid, sodium stearate, glycerine and glycols.

Depending on the composition of the extrudate composition, the pH can be acid or alkaline. Where the process uses an acidic aqueous solution, the pH-value of the solution can be between 3 and 4. Desirably, acetic acid is used to acidify the solution.

Where the process uses an alkaline aqueous solution, the pH-value of the solution can be between 8 and 9. Ammonia can be used to adjust the pH to the alkaline side.

According to a further aspect, the invention provides a method of treating exhaust gas emissions from internal combustion engines from a vehicle, which method comprising contacting the exhaust gas with a three-way catalyst according to the invention. A temperature at which the exhaust gas contacts the catalyst is preferably >100° C., such as >150° C., >175° C., >200° C., >225° C., >250° C., >275° C. or >300° C., Preferably, the temperature at which the exhaust gas contacts the catalyst is <600° C., such as <550° C., <525° C. or <500° C.

According to a further aspect, the invention provides an exhaust system for an internal combustion engine, which exhaust system comprising a three-way catalyst according to the invention.

According to a further aspect, the invention provides a vehicle, e.g. an automobile, comprising an internal combustion engine and an exhaust system according to the invention. In a preferred embodiment, the internal combustion engine is a positive ignition engine, e.g. a spark ignition engine. Such engines are typically fuelled with gasoline fuel, but may also be fuelled with "alternative" fuel stocks including blends of gasoline and ethanol etc.

EXAMPLES

In order that the invention may be more fully understood, the following non-limiting Examples are provided.

Example 1

Extruded Zeolite Monolith Substrate

An extruded zeolite monolith substrate was made according to methods similar to those disclosed in U.S. Pat. No. 7,507,684. Powdered commercially available beta zeolite in hydrogen form is mixed with glass fibres, Kaolin filler and powdered synthetic boehmite (Pural SB) and is processed in an aqueous solution with a pH-value of 5-6 into a shapeable and flowable slip by admixture with cellulose (CMC-QP10000H), the plasticizer Zusoplast (a brand name of Zschimmer & Schwarz GmbH & Co KG) and the organic auxiliary agent PEO Alkox (a polyethylene oxide). The quantitative proportions of the starting materials are selected in such a way that the active material of the finished solid catalyst body contains 69% by weight of zeolite, 23% by weight of $\gamma$-$Al_2O_3$, 5% by weight of glass fibers and 3% by weight of Kaolin. The shapeable mixture is extruded into a 1" diameter×3" long flowthrough honeycomb catalyst body, i.e. with continuous channels and with a circular cross-section exhibiting a cell density of 300 cpsi or 400 cpsi (cells per square inch). Subsequently, the catalyst body is freeze dried for 1 hour at 2 mbar according to the method described in WO 2009/080155 (the entire contents of which is incorporated herein by reference) and calcined at a temperature of 580° C. to form a solid catalyst body.

Example 2

Single Layer Three-Way Catalyst on Extruded Zeolite Substrate Monolith

To the 300 cpsi and 400 cpsi 1"×3" extruded zeolite monolith substrate samples of Example 1 was washcoated a single layer of a three-way catalyst composition comprising a mixture of a majority of γ-alumina and a mixed oxide of ceria-zirconia supporting palladium (in a majority) and rhodium using methods disclosed in WO 99/47260, the entire contents of which are incorporated herein by reference, i.e. a method of coating a monolithic support, comprising the steps of (a) locating a containment means on top of a monolithic support; (b) dosing a predetermined quantity of a liquid component into the containment means, wherein the order of steps (a) and (b) is (a) then (b) or (b) then (a); and (c) applying vacuum to draw the entirety of the quantity of the liquid component into at least a portion of the monolithic support, and retaining all of the quantity of the liquid component within the monolithic support without recycle. The resulting product was dried and calcined at 600° C.

Comparative Example 3

Two-Layer Three-Way Catalyst

A commercially available cordierite monolith substrate at 300 cpsi was washcoated (according to the techniques in WO 99/47260) with a first layer comprising beta zeolite and a colloidal silica binder at 2.00 g in followed by drying and calcination at 600° C. A second, three-way catalyst layer according to Example 2 was applied in a washcoat as an overlayer over the first beta zeolite layer. The resulting product was dried and calcined at 600° C. A 1"×3" core was cut from the coated monolith substrate.

Example 4

Three-Way Catalyst Testing

Catalyst samples of Example 2 and Comparative Example 3 were tested using a laboratory synthetic catalyst activity test (SCAT) rig, according to the following steps:

(i) Lean pre-treatment at 500° C. in 5% $O_2$ in $N_2$ (balance) for 15 minutes and then cool down to 30° C. in $N_2$;
(ii) Establish baseline feed in a catalyst bypass at 16 L/min (25K/h SV) of 0.15% HC (composed of toluene 17 vol %; isopentane 24 vol %; and propylene 59 vol %), 0.1% CO, 10% $H_2O$ vapour and balance compressed air;
(iii) Begin data collection and wait for 30 seconds;
(iv) Send HC feed to sample for a 30 second adsorption maintained at 30° C.-40° C.;
(iv) Send gas feed via catalyst bypass;
(v) Remove air, HC and CO from feed, and rebalance with $N_2$ to maintain 16 L/min;
(vi) Reintroduce gas feed to sample and ramp temperature from 30° C. to 550° C. at 40° C./min;
(vii) End data collection; cool-down to 30° C. with $N_2$ flow through sample; and
(viii) Divert gas flow to bypass.

This test regime is also shown pictorially in FIG. 1, from which it can be seen that the outlet temperature during the bypass step initially increases beyond the inlet temperature but otherwise the inlet and outlet temperatures are in step.

Figure 2:
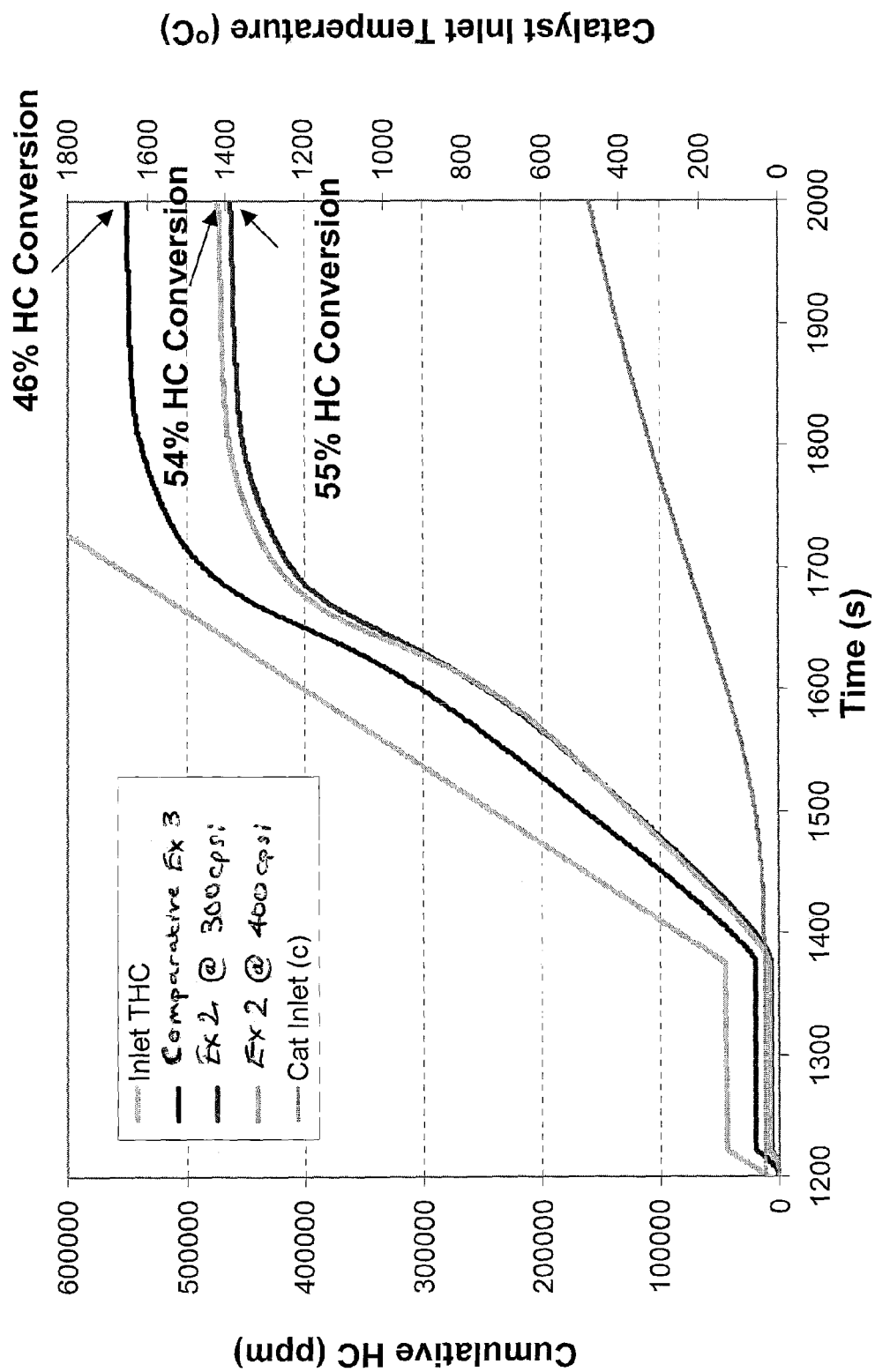
FIG. 2 is a graph comparing the cumulative hydrocarbon at outlet in testing according to Example 4 of a three-way catalyst according to Example 2 and of a Comparative three-way catalyst according to Example 3.

The results for catalyst samples of Examples 2 and Comparative Example 3 are shown in FIG. 2, from which it can be seen that the catalyst samples of Example 2 show significantly improved HC conversion (54% for the 400 cpsi embodiment and 55% for the 300 cpsi embodiment compared to 46%) than the Comparative Example 3 sample.

Example 5

Extruded Zeolite Monolith Substrate

An alternative extruded zeolite monolith substrate to Example 1 was made according to methods similar to those disclosed in U.S. Pat. No. 7,507,684. Powdered commercially available beta zeolite in hydrogen form (Tosoh) is mixed with glass fibres (Vetrotex 4.5 mm (Saint-Gobain)), low alkaline clay filler and powdered synthetic boehmite (Pural SB) and is processed in an aqueous solution with a pH-value of 5-6 into a shapeable and flowable slip by admixture with 8 wt % cellulose (based on the total inorganic solids content) (CVP-M-5280 (Dow Wolff Cellulosics)). The quantitative proportions of the starting materials are selected in such a way that the active material of the finished solid catalyst body contains 60% by weight of zeolite, 25% by weight of clay, 7% by weight γ-$Al_2O_3$ and 8% by weight of glass fibres. The shapeable mixture is extruded into a flow-through honeycomb catalyst body, i.e. with continuous channels and with a circular cross-section in a desired cell density. Subsequently, the catalyst body is freeze dried for 1 hour at 2 mbar according to the method described in WO 2009/080155 (the entire contents of which is incorporated herein by reference) and calcined at a temperature of 580° C. to form a solid catalyst body.

Example 6

Extruded $V_2O_5$/$WO_x$-$TiO_2$ Filter

A Reference extruded $V_2O_5$/$WO_x$-$TiO_2$ solid body was prepared similarly to Examples 1 and 5 by blending components A, B, F and S as set out in Table 1 with water to make a kneadable paste. Additives H (pore modifiers) were added and the material was kneaded for 10 mins to disperse the pore modifiers. The resulting composition was extruded, dried and calcined as described in Examples 1 and 5. It should be noted that the percentage quantities of inorganic solids present in the final calcined article is 100%. Quantities of additives (here H and S) that are removed by combustion during calcination are provided in wt % relative to the 100% inorganic solids content.

TABLE 1

| Active Components | | Binder | | | Stabilizer | Extrusion Additive | | | Additional Additives | | |
|---|---|---|---|---|---|---|---|---|---|---|---|
| A1 | A2 | B1 | B2 | B3 | F1 | H1 | H2 | H3 | S1 | S2 | S3 |
| 82.90 | 1.70 | 3.00 | 3.00 | 1.40 | 8.00 | 1.00 | 1.00 | 0.30 | 1.76 | 9.20 | 0.56 |

A1 = TiW (98.9%, MC 10/Cristal)
A2 = $V_2O_5$ from AMV (78% $V_2O_5$, GFE)
B1 = Bentonite (90%, ACE/Mizuka)
B2 = Kaolin (97.9% TK0177/Thiele)
B3 = $SiO_2$ (100%, Tixosil/Novus)
F1 = Glass fibers (Vetrotex 4.5 mm/Saint Gobain)
H1 = Cellulose (QP10000H/Nordmann)
H2 = PEO (Alkox/Airoko)
H3 = Zusoplast (Zschimmer&Schwarz)
S1 = MEA (Imhoff & Stahl)
S2 = $NH_3$
S3 = $C_3H_6O_3$ (Fauth)

The following pore modifiers were used instead of the Extrusion Additives H1, H2 and H3 in Table 1, with amounts shown being relative to the total weight of inorganic solid in the recipe of Table 1.

TABLE 2

| Pore Modifier | Wt % Used in Table 1 Recipe | Pore Volume ($mm^3/g$) | Pore Radius (Å) | Porosity (%) |
|---|---|---|---|---|
| Reference | See Table 1 | 310.1 | 1783.6 | 39.8 |
| Cellulose CMC-QP10000H (Nordmann) | 20 | | | |
| BC200 (Kremer Pigmente GmbH & Co. KG) | 13 | | | |
| PAN Fibres Recycling | 13 | | | |
|  | 9 | 333.6 | 1930.9 | 41.2 |
| Arbocel (Schwarzwälder Textil-Werke) | 10 | 427 | 2950 | 47.2 |
| HOP Fibre (Osthoff-Petrasch GmbH) | 10 | 426 | 2629 | 48.8 |
| Arbocel (Schwarzwälder Textil-Werke) | 15 | 524 | 5281 | 50.2 |
| HOP Fibre (Osthoff-Petrasch GmbH) | 15 | 543 | 3085 | 54.4 |

Porosity and pore volume and pore radius can be measured e.g. using mercury intrusion porosimetry.

Figure 3:
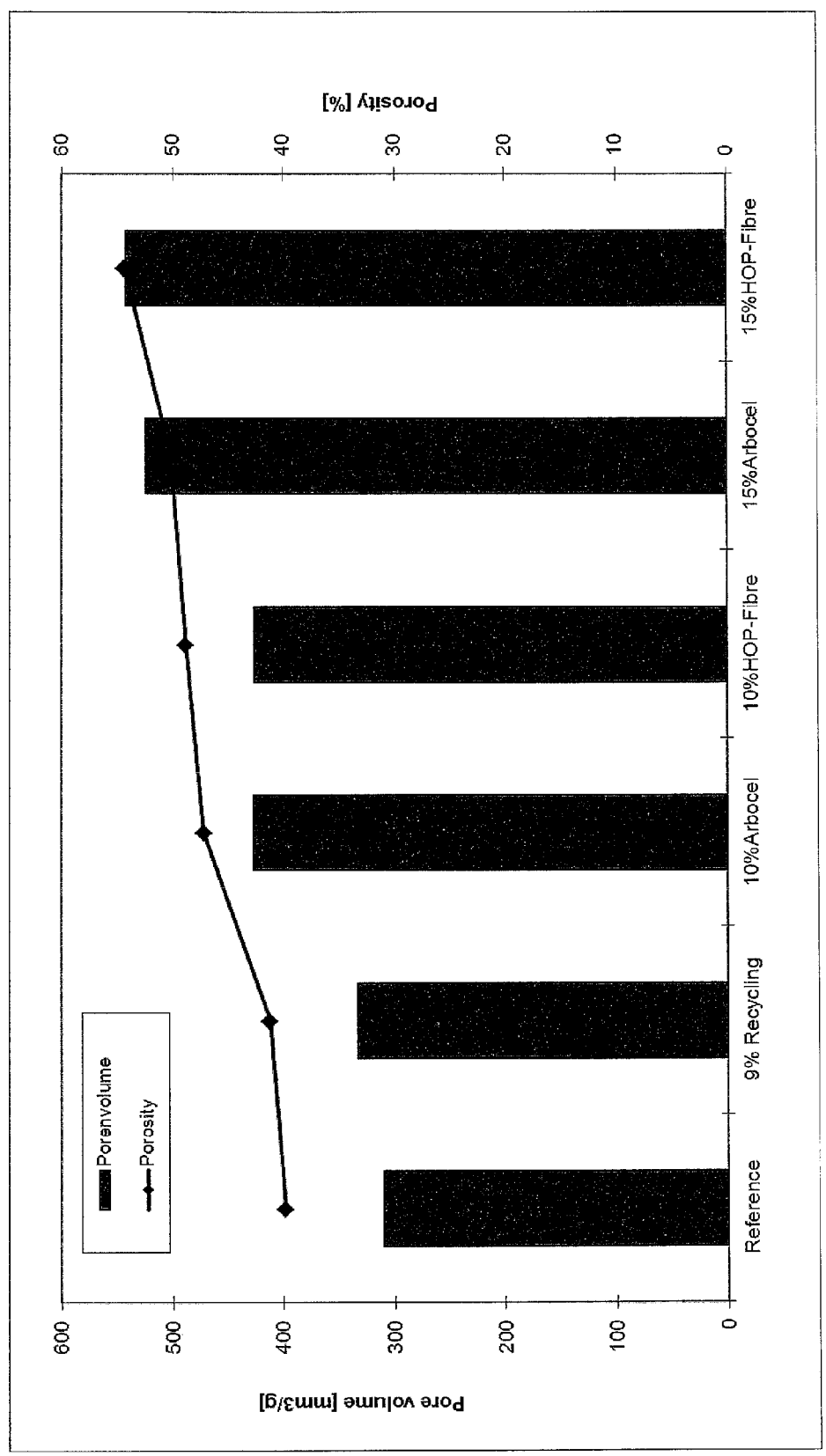
FIG. 3 is a graph comparing the pore volume and porosity of various $V_2O_5/WO_x$-$TiO_2$ filter materials prepared using various pore modifiers relative to a Reference product used in a flow-through configuration.

The results of Table 2 entries including pore volume and porosity are also represented in FIG. 3. It can be seen from these results that the porosity and pore volume of the Reference can be increased by appropriate selection of pore modifiers so that an extruded solid body made using such pore modifiers may be used in the manufacture of wall-flow filters.

These results are generic for increasing the porosity, pore volume etc. properties independent of the active components of the solid extruded body. That is, although increasing porosity and pore volume etc. of this Example 6 are illustrated using $V_2O_5/WO_x$-$TiO_2$ active materials, the principles of increasing porosity and pore volume etc. disclosed in this Example 6 are applicable to the extrusion of any active material, e.g. an extruded solid body for use in a gasoline soot filter comprising a three-way catalyst, because the pore modifiers are burnt out in the calcination process leaving the active materials and fillers etc. behind as inorganic solids.

Figure 4:
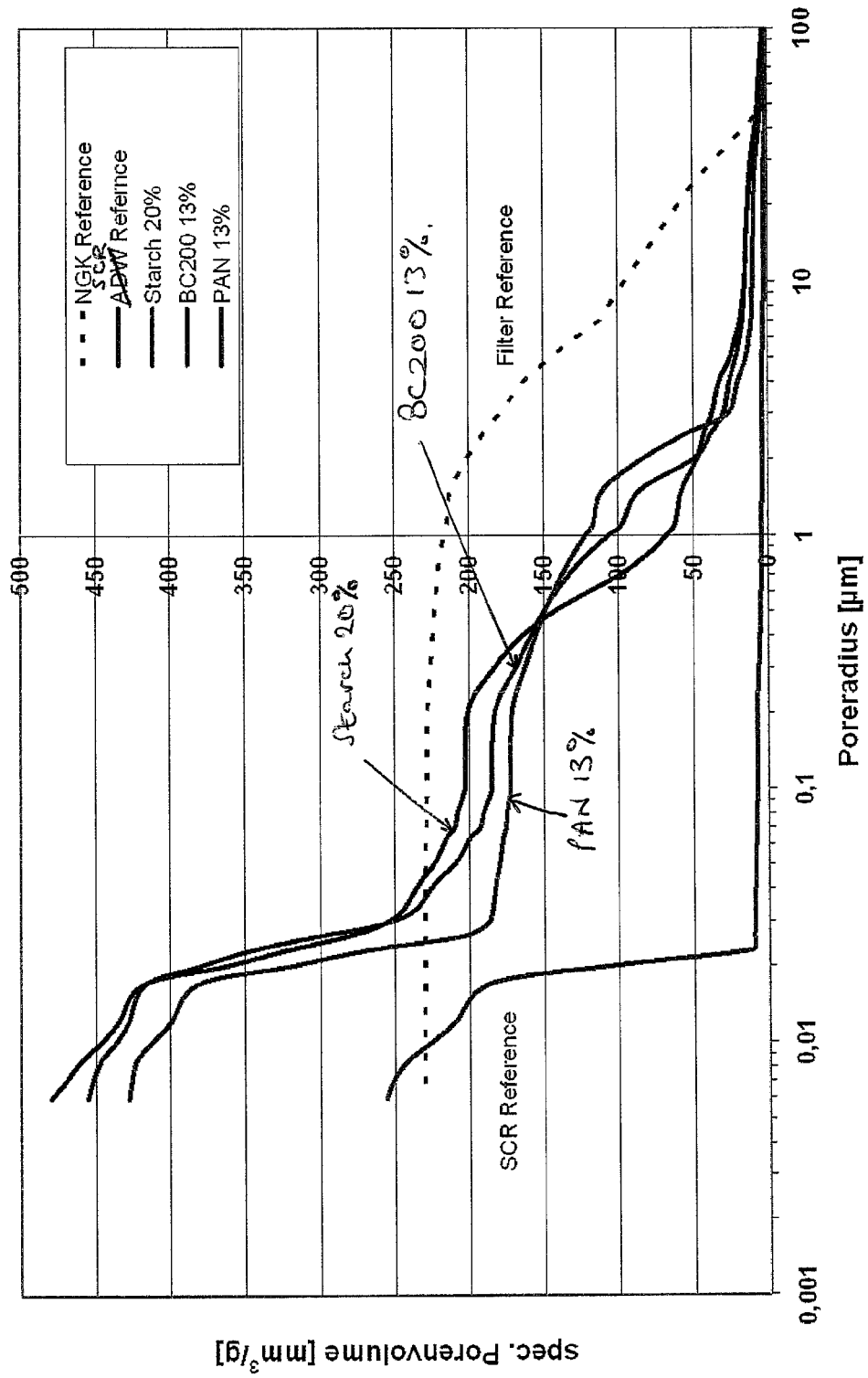
FIG. 4 is a graph plotting the pore volume against pore radius for a number of pore modifiers relative to the $V_2O_5/WO_x$-$TiO_2$ Reference and a commercially available wallflow filter substrate.

FIG. 4 compares the pore volume of a different Reference with solid extruded $V_2O_5/WO_x$-$TiO_2$ materials prepared using other pore modifiers set out in Table 2 compared also with a commercially available wallflow filter (NGK). It can be seen from the graph that the inclusion of pore modifiers has improved the porosity and pore volume of the Reference extruded solid body so that the materials have properties approaching those of commercially available wall-flow filters.

Example 7

Extruded Catalysed Soot Filter

This is a prophetic example. A catalysed wall-flow filter monolith substrate can be prepared as follows. An appropriate amount of $CeO_2$—$ZrO_2$ mixed oxide may be mixed with glass fibres, powdered synthetic boehmite (Pural SB) and beta zeolite and processed in an aqueous solution with a pH-value of 3.5 into a shapeable and flowable slip containing 1.2 wt % cellulose (CMC-QP1000011), 1.0 wt % of the organic auxiliary agent PEO Alkox (a polyethylene oxide) and 13 wt % of a mixture of the pore modifiers Rettenmaier BC200 and polyacrylonitrile (PAN) fibres. The quantitative proportions of the starting materials may be selected in such a way that the active material of the finished solid catalyst body contains 25% by weight of $CeO_2$—$ZrO_2$, 15 wt % beta zeolite, 52% by weight of $\gamma$-$Al_2O_3$ and 8% by weight glass fibres. The shapeable mixture can then be extruded into a honeycomb catalyst body with continuous channels and with a circular cross-section exhibiting a cell density of 300 cpsi (cells per square inch). Subsequently, the catalyst body can be freeze dried for 1 hour at 2 mbar according to the method described in WO 2009/080155 (the entire contents of which is incorporated herein by reference) and calcined at a temperature of 580° C. to form a solid catalyst body. Typically, it would be expected that the resulting product would have a mean pore size of approximately 10 µm.

The extruded flow-through monolith substrate comprising a plurality of channels may be made into a wall-flow filter arrangement whereby a plurality of first channels is plugged at an upstream end and a plurality of second channels not plugged at the upstream end are plugged at a downstream end, wherein the arrangement of the first and second channels is such that laterally and vertically adjacent channels are plugged at opposite ends in the appearance of a checkerboard by inserting substantially gas impermeable plugs at the ends of the channels in the desired pattern according to EP 1837063 (the entire contents of which is incorporated herein by reference). This filter arrangement is also disclosed in SAE 810114 (the entire contents of which is incorporated herein by reference). The calcined extruded monolith substrate can be coated with a washcoat comprising Pt—Rh according to the methods disclosed in WO 99/47260 or PCT/GB2011/050005 filed on 4 Jan. 2011. The latter method comprises the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate.

For the avoidance of any doubt, the entire contents of any and all documents cited herein are incorporated herein by reference.

The invention claimed is:

1. A three-way catalyst comprising an extruded solid body comprising:
   10-95% by weight of at least one binder/matrix component;
   5-90% by weight of an aluminosilicate zeolite having a silica-to-alumina ratio of 10 to 150; and
   0-80% by weight optionally stabilised ceria,
   which catalyst comprising at least one precious metal and optionally at least one non-precious metal, wherein:
   (i) the at least one precious metal is carried in one or more coating layer(s) on a surface of the extruded solid body;
   (ii) at least one metal is present throughout the extruded solid body and at least one precious metal is also carried in one or more coating layer(s) on a surface of the extruded solid body; or
   (iii) at least one metal is present throughout the extruded solid body, is present in a higher concentration at a surface of the extruded solid body and at least one precious metal is also carried in one or more coating layer(s) on the surface of the extruded solid body.

2. A catalyst according to claim 1, wherein the at least one metal is associated with the zeolitic molecular sieve component, the non-zeolitic molecular sieve component or either or both of the zeolitic molecular sieve component and the non-zeolitic molecular sieve components in the mixture.

3. A catalyst according to claim 2, wherein the extruded solid body comprises at least one first metal associated with the zeolitic molecular sieve component, the non-zeolitic molecular sieve component or either or both of the zeolitic molecular sieve component and the non-zeolitic molecular sieve components in the mixture and at least one second metal that is not associated with the zeolitic molecular sieve component, the no n-zeolitic molecular sieve component or either or both of the zeolitic molecular sieve component and the non-zeolitic molecular sieve components in the mixture.

4. A three-way catalyst according to claim 1, wherein the precious metal is selected from the group consisting of Pt, Au, Ag, Ir, Ru, Rh, Pd and Os.

5. A three-way catalyst according to claim 1, wherein:
   the at least one binder/matrix component is selected from the group consisting of cordierite, nitrides, carbides, borides, intermetallics, lithium aluminosilicate, an optionally doped alumina, a silica source, titania, zirconia, titania-zirconia, zircon and mixtures of any two or more thereof; and
   the zeolitic molecular sieve, the non-zeolitic molecular sieve or the mixture of any two or more thereof each optionally contain one or more metal; and
   the extruded solid body further comprises:
   0-80% by weight of spinel; and
   0-25% by weight inorganic fibres.

6. A three-way catalyst according to claim 1, wherein the extruded solid body consists essentially of: the at least one binder/matrix component; the zeolitic molecular sieve, the non-zeolitic molecular sieve or the mixture of any two or more thereof in an amount of 50-90% by weight; and 0-25% by weight of inorganic fibres, wherein the at least one binder/matrix component is selected from the group consisting of cordierite, nitrides, carbides, borides, intermetallics, lithium aluminosilicate, a spinel, an optionally doped alumina, a source of silica, titania, zirconia, titania-zirconia, zircon and mixtures of any two or more thereof;
   the zeolitic molecular sieve, the non-zeolitic molecular sieve or the mixture of any two or more thereof each optionally contain one or more metal.

7. A three-way catalyst according to claim 1, wherein the extruded solid body consists essentially of: the at least one binder/matrix component; the zeolitic molecular sieve, the non-zeolitic molecular sieve or the mixture of any two or more thereof in an amount of 5-50% by weight; the optionally stabilised ceria in an amount of 20-80% by weight; and 0-25% by weight of inorganic fibres, wherein
   the at least one binder/matrix component is selected from the group consisting of a cordierite, nitrides, carbides, borides, intermetallics, lithium aluminosilicate, an optionally doped alumina, a spinel, a silica source, titania, zirconia, titania-zirconia, zircon and mixtures of any two or more thereof;
   the zeolitic molecular sieve, the non-zeolitic molecular sieve or the mixture of any two or more thereof each optionally contain one or more metal.

8. A three-way catalyst according to claim 1 in the form of a wall-flow filter.

9. A three-way catalyst according to claim 1 comprising the extruded solid body in the flow-through configuration, wherein the extruded solid body consists essentially of: the at least one binder/matrix component; the zeolitic molecular sieve, the non-zeolitic molecular sieve or the mixture of any two or more thereof in an amount of 50-81% by weight; and 0-20% by weight of inorganic fibres, wherein
   the at least one binder/matrix component comprises 15-30% by weight of cordierite, nitrides, carbides, borides, intermetallics, lithium aluminosilicate, a spinel, an optionally doped alumina, titania, zirconia, titania-zirconia, zircon and mixtures of any two or more thereof and 0-20% by weight of a source of silica;
   the zeolitic molecular sieve, the non-zeolitic molecular sieve or the mixture of any two or more thereof each optionally contain one or more metal; and
   the extruded solid catalyst body is coated with a single layer comprising a mixture of a majority of γ-alumina and a stabilised ceria supporting palladium only, a mixture of palladium and rhodium, a mixture of platinum and rhodium or a mixture of platinum, palladium and rhodium.

10. A three-way catalyst according to claim 1, wherein the zeolitic molecular sieve, the non-zeolitic molecular sieve or the mixture of any two or more thereof is selected from the group consisting of ZSM-5, beta, ferrierite and mixtures of any two or more thereof.

11. A three-way catalyst according to claim 1, wherein the at least one metal present in each of: (a) throughout the extruded solid body; (b) present in a higher concentration at a surface of the extruded solid body; and (c) carried in one or more coating layer(s) on a surface of the extruded solid body in features (ii) or (iii) is different from the at least one metal present in the other location(s).

12. A three-way catalyst according to claim 1, wherein the at least one metal is associated with the zeolitic molecular sieve component, the non-zeolitic molecular sieve component or either or both of the zeolitic molecular sieve component and the non-zeolitic molecular sieve components in the mixture.

13. A three-way catalyst according to claim 12, wherein the or each at least one metal associated with the zeolitic molecular sieve, non-zeolitic molecular sieve or both molecular sieves in the mixture of any two or more thereof contains one or more metal selected from the group consisting of a transition metal, a lanthanide or a mixture of any two or more thereof.

14. A three-way catalyst according to claim 13, wherein the one or more metal is the transition metal and the transition metal is selected from the group consisting of Cu, Pd, and Ag.

15. A three-way catalyst according to claim 1, wherein the aluminosilicate zeolite is a medium pore molecular sieve, a large pore molecular sieve, or a meso pore molecular sieve.

16. A three-way catalysed soot filter comprising an extruded solid body in the wall-flow filter configuration, which extruded solid catalyst body consisting essentially of:
   15-70% by weight of cordierite, nitrides, carbides, borides, intermetallics, lithium aluminosilicate, a spinel, an optionally doped alumina, titania, zirconia, titania-zirconia, zircon and mixtures of any two or more thereof;
   0-20% by weight of a source of silica;
   5-50% by weight of an aluminosilicate zeolite having a silica-to-alumina ratio of 10 to 150;
   20-80% by weight optionally stabilised ceria; and
   0-20% by weight of inorganic fibres, which extruded solid catalyst body being coated with one or more layer(s) comprising supported at least one precious metal and combinations of any two or more precious metals.

17. A process of manufacturing a three-way catalyst comprising the steps of:
   forming a solid extruded body by mixing powdered starting materials of: at least one binder/matrix component or a precursor of one or more thereof; an aluminosilicate zeolite having a silica-to-alumina ratio of 10 to 150; an optional optionally stabilised ceria; and an optional at least one metal compound; with optional inorganic fibres; optionally adding an organic auxiliary agent; processing by mixing and/or kneading in an acid or alkaline aqueous solution optionally containing a metal salt of at least one metal into a plastic compound to form a mixture; extruding the mixture into a catalyst body, drying the catalyst body and calcining to form a solid extruded body;
   selecting quantitative proportions of the starting materials such that the solid extruded body comprises 10-95% by weight of at least one binder/matrix component; 5-90% by weight of a zeolitic molecular sieve, a non-zeolitic molecular sieve or a mixture of any two or more thereof; and 0-80% by weight optionally stabilised ceria, and coating a surface of the solid extruded body with at least one coating layer(s) containing at least one precious metal and optionally also impregnating a surface of the solid extruded body with at least one metal.

18. A method of treating exhaust gas emissions from internal combustion engines from a stationary source or a vehicle, wherein said exhaust gas has HC, CO, and $NO_x$, which method comprising oxidizing the HC and CO and reducing the $NO_x$ by contacting the exhaust gas with a three-way catalyst according to claim 1.

19. An exhaust system for an internal combustion engine, which exhaust system comprising a three-way catalyst according to claim 1.

20. A vehicle comprising an internal combustion engine and an exhaust system according to claim 19.

* * * * *